United States Patent
Eguchi et al.

[11] Patent Number: 5,914,866
[45] Date of Patent: Jun. 22, 1999

[54] DEVICE AND METHOD FOR CONTROLLING INVERTER PERFORMING FEEDBACK CONTROL TO SUPPRESS PERIODIC COMPONENT AND UNSTEADY COMPONENT OF ERROR

[75] Inventors: Masaki Eguchi, Uji; Hirokazu Kodama, Gojo; Tsukasa Takebayashi; Hirofumi Nakata, both of Yamatotakada, all of Japan

[73] Assignee: Sharp Kabushiki Kaisha, Osaka, Japan

[21] Appl. No.: 08/988,124

[22] Filed: Dec. 10, 1997

[30] Foreign Application Priority Data

Dec. 13, 1996 [JP] Japan ................................ 8-333624

[51] Int. Cl.⁶ ............................ H02M 1/12; H02M 7/515
[52] U.S. Cl. .............................. 363/40; 363/95; 363/131
[58] Field of Search ............................ 363/39, 40, 41, 363/42, 43, 56, 95, 98, 131, 132, 71

[56] References Cited

U.S. PATENT DOCUMENTS

| | | | |
|---|---|---|---|
| 4,503,316 | 3/1985 | Murase et al. | 219/130.32 |
| 5,347,442 | 9/1994 | Henmi et al. | 363/41 |
| 5,371,667 | 12/1994 | Nakao et al. | 363/124 |
| 5,408,404 | 4/1995 | Mitchell | 363/71 |
| 5,519,306 | 5/1996 | Itoh et al. | 323/222 |
| 5,668,713 | 9/1997 | Eguchi et al. | 363/95 |

OTHER PUBLICATIONS

PWM Control of Solar Generation System in accordance with DSP Record of The 1993 Kansai–Section Joint Convention of Institutes of Electrical Engineering. Japan.
Abstract of Japanese Patent 08098543 A published Apr. 12, 1996.

*Primary Examiner*—Adolf Doneke Berhane
*Attorney, Agent, or Firm*—David G. Conlin; William J. Daley, Jr.

[57] ABSTRACT

An inverter-control device includes a subtractor for detecting an error between a waveform of a reference current signal generated in synchronization with a waveform of an inverter output current signal and the inverter output current signal, a delay portion for delaying by a prescribed time period a signal obtained by amplifying and removing high frequency component by filtering the error, an error waveform integrating portion for integrating the delayed signal f' output from delay portion, a proportional control portion for amplifying the error, and an adding portion for adding an error amplified signal output from the proportional control portion and an inverter driving waveform pattern output from the error waveform integrating portion.

34 Claims, 8 Drawing Sheets

DEVICE AND METHOD FOR CONTROLLING INVERTER PERFORMING FEEDBACK CONTROL TO SUPPRESS PERIODIC COMPONENT AND UNSTEADY COMPONENT OF ERROR

BACKGROUND OF THE INVENTION

1. Field of the Invention

The present invention relates to an inverter control device for controlling output waveform of an inverter used in a power converter or the like, and to an inverter control method.

2. Description of the Background Art

Figure 1:
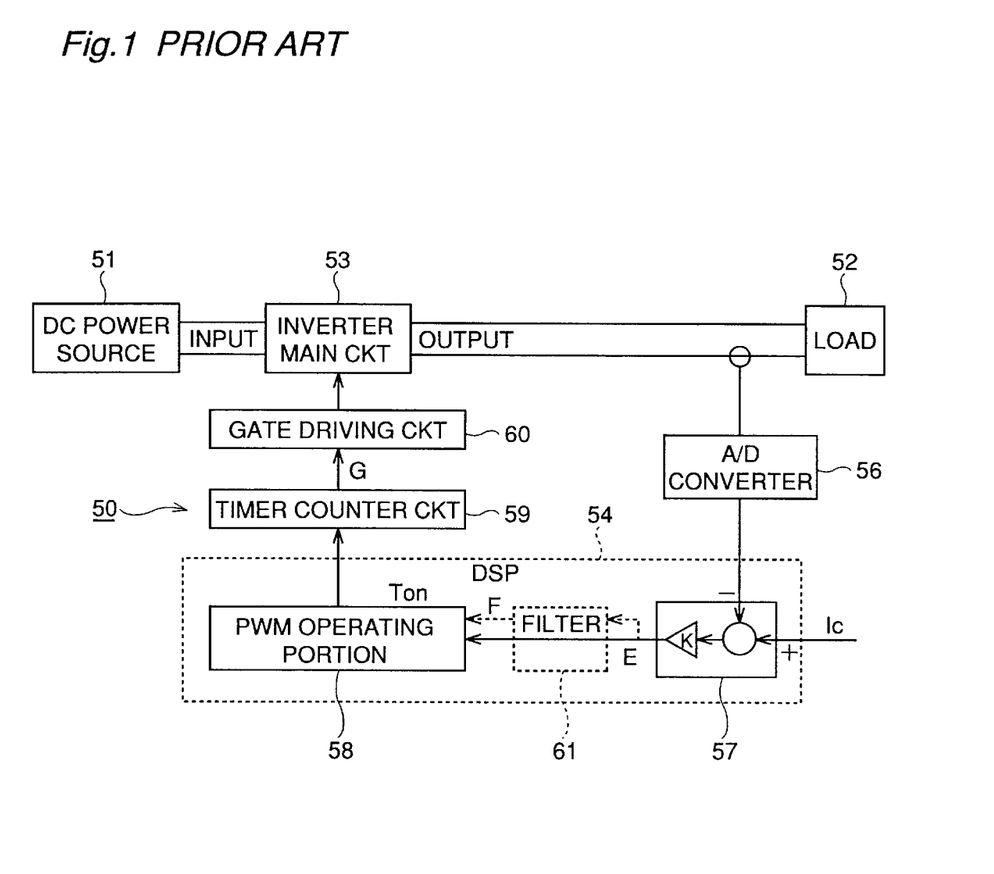
FIG. 1 is a block diagram showing a schematic structure of a conventional inverter device.

An inverter device shown in FIG. 1 has been known. The inverter device 50 controls an inverter main circuit 53 which outputs an AC current for driving a load 52 using a DC current from a DC power source 51 as an input. In inverter device 50, an inverter control device 54 formed of a DSP (Digital Signal Processor) instantaneously controls the value of the output current from inverter main circuit 53.

The method of control by inverter control device 54 will be described in the following. A current detector 55 detects an output current from inverter main circuit 53, and the output current value is subjected to A/D conversion at a prescribed sampling frequency by an A/D (Analog/Digital) converter 56. The output current signal $I_O$ provided by the A/D conversion is input together with a reference current signal $I_c$ to inverter control device 54.

Inverter control device 54 includes an error amplifying portion 57 and a PWM (Pulse Width Modulation) operating portion 58 realized by software programming in the DSP. Error amplifying portion 57 calculates an error amplified signal $E=K(I_C-I_O)$ based on the output current signal $I_O$ and the reference current signal $I_C$, where K represents proportional gain.

PWM operating portion 58 calculates a gate on time $T_{on}$ of switching elements (not shown) constituting inverter main circuit 53, based on the error amplified signal E. The gate on time $T_{on}$ calculated by inverter control device 54 is output to a timer counter circuit 59. Based on the input gate on time $T_{on}$, timer counter circuit 59 generates a gate driving signal G for each switching element, and outputs it to a gate driving circuit 60. In gate driving circuit 60, based on the gate driving signal G input thereto, switching of inverter main circuit 53 is performed.

As for the input of output current signal $I_O$ and reference current signal $I_c$, calculation of error amplified signal E, and calculation and output of gate on time $T_{on}$, these are continuously executed at prescribed sampling period.

Inverter control device 54 may be described as a proportional control system, as in the following. Referring to the control block diagram of FIG. 2, an output current signal $I_O$ of an inverter 71 (including PWM operating portion 58, timer counter circuit 59, gate driving circuit 60, inverter main circuit 53 and so on) is detected by a current detector 70 (which corresponds to current detector 55 and A/D converter 56), and the current value is input to error amplifying portion 57. In error amplifying portion 57, a subtracting portion 57a subtracts output current signal $I_O$ from separately input reference current signal $I_C$ ($I_c-I_O$). The result of subtraction is proportionally compensated (amplified) by using proportional gain K by a proportional control portion 57b, and its output (=error amplified signal) E is input to inverter 71. Inverter 71 forms, based on the output E from proportional control portion 57b, the output current signal $I_O$.

Figure 2:
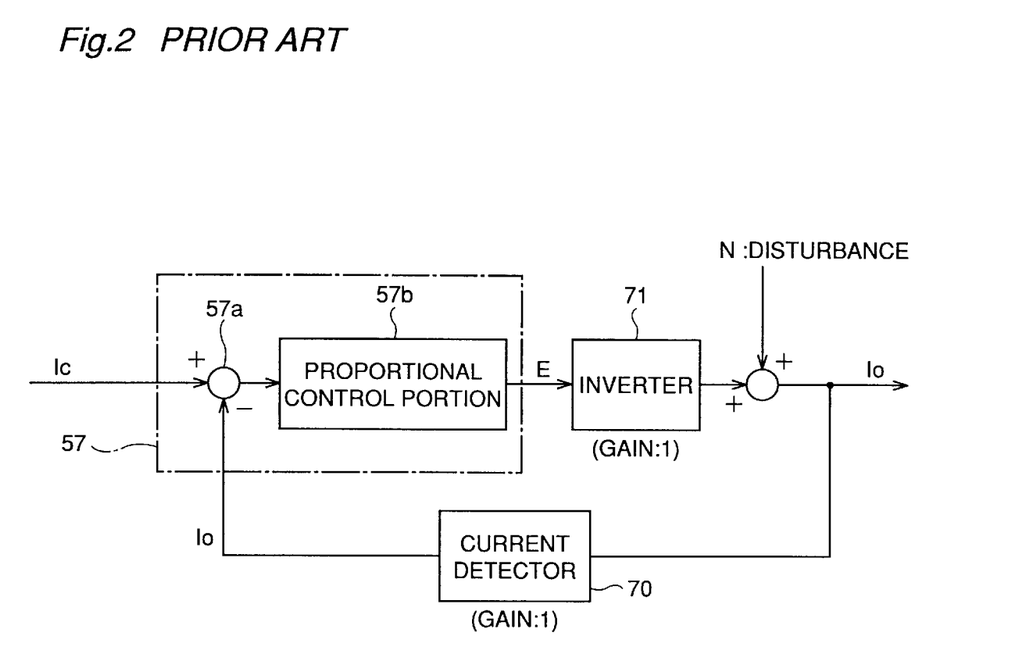
FIG. 2 is a block diagram showing a schematic structure of a conventional inverter control device.

On the thus formed output current signal $I_O$, disturbance N which is inevitable because of the structure of inverter 71 is superposed. As an example, disturbance N is generated because of the following function. More specifically, disturbance N is caused by non-linearity derived from the fact that collector current at turn on of the switch element such as an IGBT (Insulated Gate Bipolar Transistor) is not proportional to the actual on time. If such disturbance N is generated, harmonic distortion of fundamental frequency is superposed on the output current.

It may be possible to remove the influence of such disturbance N by infinitely increasing proportional gain K of proportional control portion 57b. The larger the proportional gain K, the smaller the influence of disturbance N on output current signal $I_O$. Therefore, ideally, when proportional gain K is made infinite, the error between reference current signal $I_C$ and output current signal $I_O$ can be made zero.

However, in the actual inverter control device 50, inverter main circuit 53 and other peripheral circuitry have frequency characteristics including delay. Therefore, when proportional gain K is increased, the control system would be unstable, resulting in oscillation. Accordingly, inordinate increase in proportional gain K is not a practical solution.

In view of the foregoing, in the conventional inverter control device 50, a low pass filter 61 (see FIG. 1) is provided on the output side of error amplifying portion 57 to suppress high frequency oscillation of output current signal $I_O$. It has been also proposed to filter the output (=error amplified signal) E of proportional control portion 57b by low pass filter 61 so as to decrease proportional gain K in high frequency range, and to have PWM operating portion 58 perform PWM operation using the filtered output F.

However, even when such measure is taken, the high frequency oscillation is not always well suppressed, since low pass filter 61 itself has delay which means that low pass filter 61 as a solution newly introduces delay.

Generally, in order to efficiently decrease proportional gain K in high frequency range by using low pass filter 61, cutoff frequency is made lower and the amount of attenuation is increased. However, these measures also result in larger delay of low pass filter 61. Therefore, proportional gain K could not readily be decreased.

The inventors of the present invention proposed, in Japanese Patent Laying-Open No. 7-267495, an inverter control device in which the above described influence of delay is eliminated. This proposal will be described in the following.

In the inverter control device, the inverter output is adjusted to have a desired output waveform by a periodic component control portion. More specifically, first, error between the inverter output waveform and the desired output waveform is calculated using one period of the fundamental wave of the inverter output as a unit period, so as to form an error waveform pattern of one period of the fundamental wave. The thus formed error waveform pattern is advanced relatively in phase by such amount that corresponds to the delay to be addressed, and the pattern thus advanced in phase is added to an inverter driving waveform pattern in accordance with which the inverter has been driven in the last period. In other words, the periodic component control portion integrates the error waveform pattern which has been subjected to the phase advancing process, and thus provides the inverter driving waveform pattern. The inverter output is controlled based on the inverter driving waveform pattern prepared in this manner.

Accordingly, it becomes possible for inverter control device to adjust the inverter output waveform gradually until it matches the desired output waveform, while the influence of delay is eliminated. Further, it becomes possible by the inverter control device to cancel harmonic distortion of the fundamental frequency caused by the fact that the collector current at the time of turn on of the IGBT is not proportional to the actual on time.

However, the conventional inverter control device which eliminates influence of delay and cancels harmonic distortion does not provide sufficient waveform control when the load varies abruptly. Accordingly, undesirable phenomena such as irregular current waveform and excessive current have been experienced, as described in the following.

In the conventional inverter control device in which the inverter driving waveform pattern is prepared by integrating the error waveform pattern which has been subjected to a prescribed phase advancing process, the error waveform pattern is advanced in phase to eliminate influence of delay. However, in actual waveform processing, it is not possible to have the error wave pattern advanced. Therefore, the phase advancing process is a relative one with respect to the inverter driving waveform pattern, realized by delaying the error waveform pattern actually. Therefore, the information of the error waveform pattern is reflected on the inverter output delayed by one period.

If a load 52 connected to inverter 71 is in a steady state, this method exhibits sufficient effect of control. However, if the load changes abruptly, control response to the abrupt change is delayed at least close to one period, and undesirable phenomenon such as irregular current waveform and excessive current have been experienced in this time lag.

SUMMARY OF THE INVENTION

An object of the present invention is to provide an inverter control device which allows stable control by compensating for a delay, which is a cause of high frequency oscillation, in feedback control of an inverter output, and allows improvement in output waveform distortion and response to load fluctuation.

Another object of the present invention is to provide a method of controlling an inverter enabling stable control by compensating for a delay, which is a cause of high frequency oscillation, in feedback control of an inverter output, and allowing improvement in output waveform distortion and the response to load fluctuation.

According to an aspect of the present invention, the inverter control device includes an error detecting portion for detecting an error between the desired output waveform and the inverter output waveform, a periodic component control portion for controlling the inverter output such that periodic component of the error is reduced, and an unsteady component control portion for controlling the inverter output such that unsteady component of the error is reduced. When the load connected to the inverter device is in the steady state, the waveform of the inverter output is mainly controlled by the periodic component control portion. The unsteady component of the inverter output generated by slight fluctuation in the load is corrected by the unsteady component control portion. Therefore, the harmonic distortion of the fundamental frequency caused by the fact that the collector current at the time of turn on in the IGBT of the inverter control device is not proportional to the on time is corrected by the periodic component control portion. Output waveform distortion caused by fluctuation of the load is corrected by the unsteady component control portion.

According to another aspect of the present invention, the method for controlling the inverter adjusts the inverter output waveform to match the desired output waveform, and the method includes the steps of detecting error between the desired output waveform and the inverter output waveform, controlling the inverter output such that periodic component of the detected error is reduced, and controlling the inverter output such that the unsteady component of the detected error is reduced. When the load connected to the inverter is in a steady state, the inverter output waveform is controlled such that periodic component of the detected error is reduced. Meanwhile, when there is slight fluctuation in the load, the inverter output waveform is controlled such that unsteady component of the inverter output is reduced. Therefore, harmonic distortion of fundamental frequency caused by the fact that the collector current at the time of turn on in the IGBT of the inverter device is not proportional to the on time is corrected by reducing periodic component of the error. The output waveform distortion caused by fluctuation of the load is corrected by reducing unsteady component.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 3:
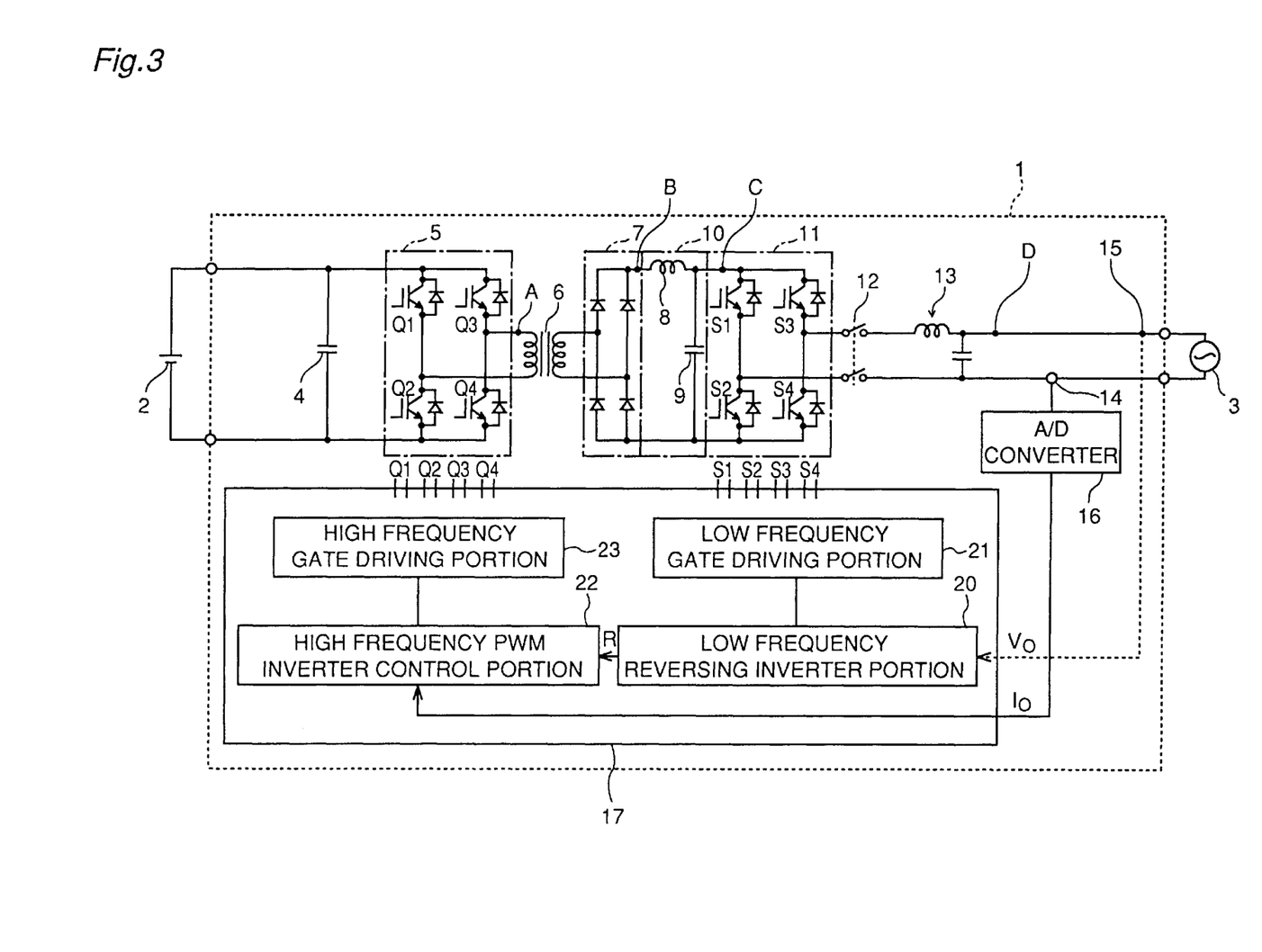
FIG. 3 is a block diagram showing a schematic structure of the inverter device in accordance with a first embodiment of the present invention.

FIG. 3 shows an overall structure of inverter device 1 incorporating the inverter control device in accordance with the first embodiment of the present invention. Inverter device 1 converts a DC power provided by a solar cell 2 to AC power having same phase and same frequency (50/60 Hz) as mains (commercially used power source), and supplies the converted power to mains 3.

Inverter device 1 includes a capacitor 4, a high frequency inverter bridge 5, a high frequency transformer 6, a diode bridge 7, a filter circuit 10, a low frequency inverter bridge 11, a relay 12, an AC filter 13, an inverter output current detector 14, a voltage detector 15, an A/D converter 16 and an inverter control device 17.

Capacitor 4 suppresses fluctuation of the DC voltage output from solar cell 2. High frequency inverter bridge 5 converts the DC power input to inverter device 1 to a high frequency alternating current (tenth to several hundreds KHz). High frequency transformer 6 insulates solar cell 2 (primary side) from the mains 3 (secondary side). Diode bridge 7 rectifies the high frequency alternating current insulated by high frequency transformer 6. Filter circuit 10 includes a DC reactor 8 and a capacitor 9, and it smoothest the waveform rectified by diode bridge 7, by removing the high frequency component. Low frequency inverter 11 controls the DC output from filter circuit 10 by reversing the output, and produces low frequency (50/60 to several hundreds Hz) alternating current. Relay 12 relays and disconnects the inverter output, that is, the low frequency alternating current produced by low frequency inverter bridge 11, to and from the mains 3. AC filter 13 removes high frequency component of the inverter output. Inverter output current detector 14 detects current value of the inverter output. Voltage detector 15 detects the voltage of inverter output or of mains 3. A/D converter 16 performs A/D conversion of the current value detected by output current detector 14. Inverter control device 17 controls high frequency inverter bridge 5 and low frequency inverter bridge 11.

In the inverter device 1, inverter main circuit is constituted by capacitor 4, high frequency inverter bridge 5, high frequency transformer 6, diode bridge 7, filter circuit 10, low frequency inverter bridge 11, relay 12 and AC filter 13.

Inverter control device 17 includes a low frequency reversing inverter control portion 20, a low frequency gate driving portion 21, a high frequency PWM inverter control portion 22, and a high frequency gate driving portion 23.

Low frequency reversing inverter control portion 20 detects a zero cross of the voltage of the mains and generates zero cross detection pulses R, and controls the DC waveform by reversing the waveform in synchronization with the zero cross detection pulses R.

Low frequency gate driving portion 21 outputs pulses for controlling switching of the low frequency inverter bridge 11, under the control by low frequency reversing inverter control portion 20. The zero cross detection pulses R are also supplied to high frequency PWM inverter control portion 22.

High frequency PWM inverter control portion 22 controls the inverter output current waveform such that it has a sinusoidal waveform in phase with the voltage of the mains 3. High frequency gate driving portion 23 switches the high frequency inverter bridge 5 under the control by high frequency PWM control portion 22.

Figure 4:
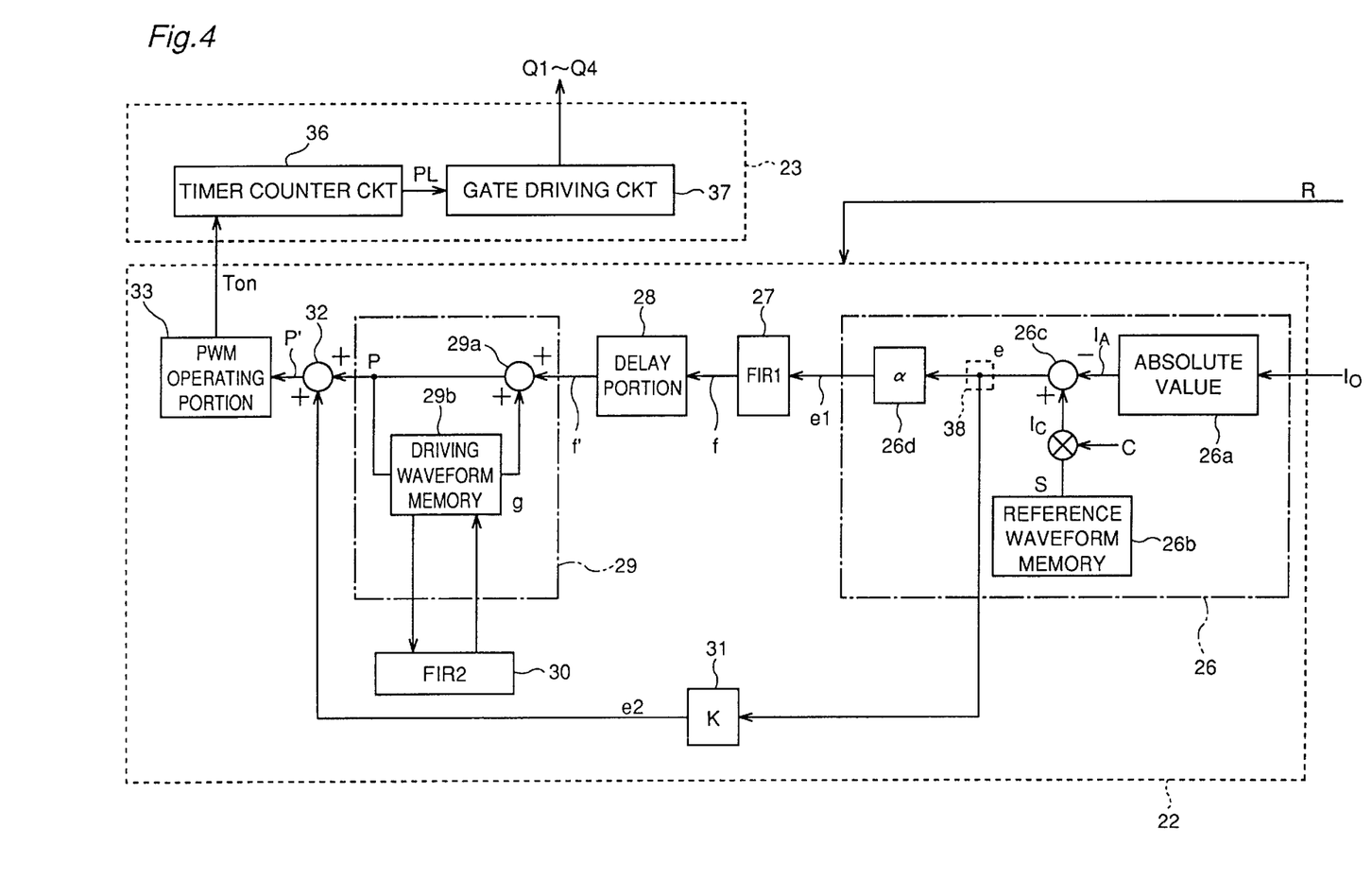
FIG. 4 is a block diagram showing a schematic structure of the inverter control device in accordance with the first embodiment of the present invention.

Referring to FIG. 4, processing in high frequency PWM inverter control portion 22 is realized by various functions of the DSP. Therefore, high frequency PWM inverter control portion 22 shown in FIG. 4 represents processing performed by the DSP.

High frequency PWM inverter control portion 22 includes an error amplified signal generating portion 26 for amplifying an error based on inverter output current signal $I_O$ and reference current signal $I_C$; a first low pass filter (FIR1) 27 for removing high frequency component of the output from error amplified signal generating portion 26; a delay portion 28 for delaying the output of the first low pass filter 27; an error waveform integrating portion 29 for integrating the output from delay portion 28; a second low pass filter (FIR 2) 30 for removing high frequency component of the output from error waveform integrating portion 29; a proportional control portion 31 for performing proportional control based on the inverter output current signal $I_O$ and the reference current signal $I_C$; an adding portion 32 for adding the output from proportional control portion 31 to the output of error waveform integrating portion 29; and a PWM operating portion 33 for performing PWM operation based on the result of addition at the adding portion 32.

Error amplified signal generating portion 26 includes an absolute value operating portion 26a for providing an absolute value $I_A$ of the inverter output current signal $I_O$; a reference waveform memory 26b supplying the reference current signal $I_C$; a subtractor 26c for generating an error signal E from the absolute value $I_A$ and the reference current signal $I_C$; and an error amplifying portion 26d for generating a first error amplified signal e1 from error signal e.

Error waveform integrating portion 29 includes a driving waveform memory 29b for storing the inverter driving waveform pattern generated by the error waveform integrating portion 29, and an adding portion 29a for adding the inverter driving waveform pattern P stored in the driving waveform memory 29b to the output of delay portion 28.

The operation of the high frequency PWM inverter control portion 22 structured as described above is as follows.

First, the operation of the error amplified signal generating portion 26 will be described. In absolute value operating portion 26a, the absolute value $I_A$ of the inverter output current signal $I_O$ supplied from A/D converter 16 is provided. In subtracting portion 26c, from the absolute value $I_A$ supplied from absolute value operating portion 26a and reference current signal $I_C$ supplied from reference current waveform memory 26b, error signal e ($=I_A-I_O$) is provided. In error amplifying portion 26d, the error signal e supplied from subtracting portion 26c is multiplied by an error amplification factor α, thus providing a first error amplified signal e1 ($=\alpha(I_A-I_C)$).

Reference waveform memory 26b stores a table of sinusoidal data S of half period of the desired AC waveform, and the sinusoidal data S is read successively form the table every time the output current signal $I_O$ is input (sampled). The sinusoidal data S output from reference waveform memory 26b has its amplitude determined by an output command C, thus it is provided as reference current signal $I_C$. The position of reading of sinusoidal data S is reset when the zero cross detection pulse R is input to high frequency PWM inverter control portion (DSP) 22.

The first low pass filter (FIR 1) 27 removes high frequency component of the first error amplified signal e1 input from error amplified signal generating portion 26, and outputs a signal f with its high frequency component filtered to delay portion 28. Delay portion 28 provides the delay of (T−τ) to the signal f, and outputs the delayed signal f′ to error waveform integrating portion 29, where T represents fundamental period of the inverter output current signal $I_O$, and τ represents delay time in a feedback loop constituted by the inverter main circuit, inverter output current detector 14, the first low pass filter 27 and so on.

The operation of the error waveform integrating portion 29 which integrates the delayed signal f′ formed in this manner is as follows.

The driving waveform memory 29b stores, of the inverter driving waveform patterns formed by the error waveform integrating portion 29, a driving waveform pattern g which corresponds to half (T/2) the fundamental period T of inverter output current signal $I_O$. The driving waveform pattern g includes I data ($w_0$ to $w_{I-1}$) which are along a time sequence. The data $w_0$ to $w_{I-1}$ are successively read from driving waveform memory 29b at every sampling of inverter output current signal $I_O$ and transmitted to adder 29a. At this time, the position of reading of data $w_0$ to $w_{I-1}$ read from driving waveform memory 29b is reset by the zero cross detection pulse R. More specifically, every time the zero cross detection pulse R is input, data is again successively read starting from the data $W_0$.

Adder 29a adds the driving waveform pattern g (including the sequence of data $w_0$ to $w_{I-1}$) successively read from driving waveform memory 29b to the signal f' output from delay portion 28 to update (integrate) the inverter driving waveform pattern P. The inverter driving waveform pattern P updated by the addition in adding portion 29a is output to adding portion 32 and driving waveform memory 29b. When inverter driving waveform pattern P is input, the driving waveform memory 29b updates the data $w_0$ to $w_{I-1}$ of the driving waveform pattern g of the previously read position. Updating of data $w_0$ to $w_{I-1}$ from the viewpoint of the data $w_0$ to $w_{I-1}$ will be described. The data $w_i$ transmitted from driving waveform memory 29b is updated to data $w_i'$ by the addition described above in adding portion 29a. The updated data $w_i'$ is input to driving waveform memory 29b, replacing the data $w_i$ which has been stored in driving waveform memory 29b.

The second low pass filter (FIR 2) 30 successively reads the data $w_0$ to $w_{I-1}$ stored in the driving waveform memory 29b and removes high frequency component of the driving waveform pattern g, and the result is again stored in the driving waveform memory 29b.

The operation of the proportional control portion 31 will be described in the following.

Proportional control portion 31 includes an error amplifier similar to error amplifying portion 26d, and it amplifies the error signal e formed by subtractor 26c with the proportional gain (=error amplification factor) K to provide the second error amplified signal e2 (=K×e).

The second error amplified signal e2 provided by the proportional control portion 31 is output to adding portion 32. It is possible to set mutually different proportional gain K and error amplification factor α in proportional control portion 31 and error amplifying portion 26d.

Adding portion 32 adds the second error amplified signal e2 input from proportional control portion 31 to the inverter driving waveform pattern P input from error waveform integrating portion 29, and the result of addition P' is output to PWM operating portion 33.

PWM operating portion 33 performs PWM operation on the result of addition P' and calculates gate on time $T_{on}$, which is output to high frequency gate driving portion 23.

High frequency gate driving portion 23 includes timer counter circuit 36 and gate driving circuit 37. Timer counter circuit 36 provides pulses PL for switching high frequency inverter bridge 5, based on the gate on time $T_{on}$ input from high frequency PWM control portion 22. Gate driving circuit 37 performs switching of the high frequency inverter bridge 5 based on the pulses PL provided by timer counter circuit 36.

The control operation by the high frequency PWM inverter control portion 22 will be described as current feedback control. High frequency PWM inverter control portion 22 includes a periodic component control portion and an unsteady component control portion, and it is characterized in that these portions are operated parallel to each other. The periodic component control portion controls periodic component by error waveform integration control, while the unsteady component control portion controls unsteady component by proportional control (more precisely, combination of the error waveform integration control and proportional control).

The unsteady component control portion includes a processing path of absolute value operating portion 26a, subtractor 26c, proportional control portion 31, adding portion 32 and PWM operating portion 33. The periodic component control portion includes a processing path of error amplified signal generating portion 26, first low pass filter 27, delay portion 28, error waveform integrating portion 29, second low pass filter 30, adding portion 32 and PWM operating portion 33.

Control operation when the periodic component control portion is operated by itself will be described. The periodic component control portion forms an inverter driving waveform pattern P in which a prescribed period of the inverter output (in the present embodiment, ½ of the period of the fundamental frequency) correspond to one set, and PWM operation is performed on the inverter driving waveform pattern P. The inverter driving waveform pattern P is used repeatedly in synchronization with the voltage of mains 3. Though the inverter driving waveform pattern P corresponds to ½ of the period of the fundamental frequency in the present embodiment, it may corresponds to one period or n periods (n: natural number).

Further, the inverter driving waveform pattern P is updated by the following feedback control. More specifically, the driving waveform pattern g of last prescribed period is stored in driving waveform memory 29b. In error signal generating portion 26, an error waveform pattern (=error signal) which is the difference between the desired periodic waveform (reference current signal) $I_C$ and the inverter output waveform (inverter output current signal) $I_O$ is formed, and by multiplying the error waveform pattern (=error signal) e by a factor α (=error amplification factor), error amplified waveform pattern (=first error amplified signal) e1 is provided. The factor α is a positive number and it relates to the speed of convergence and precision in convergence of control. The smaller the factor α, the slower the convergence of control, while the higher the precision in convergence. Meanwhile, the larger the factor α, the faster the speed of convergence while the larger the variation in convergence, in control.

By adding the error amplified waveform pattern e1 to the driving waveform pattern g of the last prescribed period stored in the driving waveform memory 29b, the inverter driving waveform pattern P is updated.

In this manner, PWM operating portion 33 newly performs PWM operation using the updated inverter driving waveform pattern P to provide the gate on time $T_{on}$, and therefore the inverter output current signal Io gradually comes closer to the desired periodic waveform.

Sometimes, the inverter device 1 has non-linearity derived from the fact that the collector current at the time of turn on of the IGBT is not proportional to the gate on time $T_{on}$. In this case, if the gate on time $T_{on}$ is short, the inverter operates in discontinuous mode, and the collector current would have a chopping waveform. In contrast, if the gate on time $T_{on}$ is long, the inverter operates in continuous mode, and the collector current waveform would be close to a rectangular wave. In such a state, the gate on time $T_{on}$ and the current amount would not be in proportion to each other, which results in current distortion.

However, such current distortion is odd numbered harmonics of the fundamental frequency of inverter output current signal $I_O$, and it is distortion of periodic component in synchronization with the reference current signal $I_C$. Accordingly, control covering such current distortion is possible by the periodic waveform control portion.

Further, in the periodic waveform control portion constituting the high frequency PWM inverter control portion 22, error amplified waveform pattern (=first error amplified signal e1) is delayed (by the function of delaying portion 28) by the time T−τ (T: fundamental period of inverter output current signal $I_0$, τ: delay time in feedback loop). Therefore, the driving waveform pattern g stored in driving waveform memory 29b (which stores the phase of the error amplified waveform pattern (first error amplified signal) e1) is advanced in phase relatively.

The delay time (T−τ) at this time corresponds to the delay of one period T of the fundamental period advanced by the delay time τ in the feedback loop, and is adapted to satisfy the law of causality. Therefore, the influence of delay generated in the feedback loop can be eliminated.

Further, the second low pass filter 30 appropriately removes the high frequency component of inverter driving waveform pattern P. Therefore, even when an error of π/2 or larger in phase equivalent is generated in the delay time (T−τ) set in the delay portion 28 resulting in oscillation of the inverter driving waveform pattern P, such oscillation can be suppressed, as the high frequency component is removed by the second low pass filter 30. Removal of high frequency component by the second low pass filter 30 involves delay during signal processing. However, there is not a problem if the delay is incorporated in the delay time τ which is compensated for by the delay compensating operation described above.

The feedback control of inverter driving waveform pattern P (mainly performed by the error waveform integrating portion 29) will be described in greater detail.

When we represent sampling period in high frequency PWM inverter control portion (DSP) 22 as Δt and discrete time as n, the signal f' input from delay portion 28 to error waveform integrating portion 29 at time n is represented by the following equation (1).

$$f'=f(n-L) \qquad (1)$$

f(n): Output of the first low pass filter 27 (=error amplified signal e1 with high frequency component removed)

$$L:(T-\tau)/\Delta t$$

The output f' of delay portion 28 input to error waveform integrating portion 29 is added in adding portion 29a to the driving waveform pattern g(n) of the last period stored in the driving waveform memory 29b as represented by the following equation (2), and inverter driving waveform pattern P(n) is provided.

$$P(n)=g(n)+f' \qquad (2)$$

The driving waveform pattern g(n) can be represented by the following equation $$g(n)=w_{n \bmod I}(n)$$

$$I=T/(2\Delta t) \qquad (3)$$

n mod I: remainder of n divided by I

I: total number of data $W_i$ (i=0, 1, . . . , I−1) constituting driving waveform pattern g(n)

T: fundamental period of inverter output current signal $I_0$

Δt: sampling period of high frequency PWM inverter control portion (DSP) 22.

Further, the driving waveform memory 29b updates the data $w_i$ of the driving waveform pattern g(n) in accordance with the following equation (4).

$$W_{n \bmod I}(n+1)=p(n) \qquad (4)$$

In the initial state, the inverter driving waveform data $w_i$ is zero without exception. However, it is updated successively in accordance with equation (4) and gradually comes closer to the optimal value.

The second low pass filter 30 is for filtering the data sequence $w_i$ of the driving waveform pattern g. The data sequence $w_i$ of the driving waveform pattern g itself is filtered by an FIR type linear phase low pass filter, as represented by the following equation (5).

$$w'_i(n) = \sum_{m=0}^{M-1} b_m w_{i-m+(M-1)/2}(n) \qquad (5)$$

m: tap number (odd number) of the second low pass filter 30

$b_m$: filter coefficient

The data $w_i$ of the driving waveform pattern g stored in driving waveform memory 29b is updated to data sequence $w'_i(n)$ calculated in accordance with equation (5), whereby the high frequency component included in the driving waveform pattern g(n) stored in driving waveform memory 29b can be removed. Further, (M−1)/2 in equation (5) represents delay time in this filtering operation, and by advancing the inverter driving waveform data w on the right side by the amount of this delay, delay in filtering is canceled. The operation of equation (5) does not need any special synchronization with other operation, and therefore it may be executed appropriately when there is margin in processing time.

The periodic component control by the periodic component control portion will be more specifically described with reference to the waveforms of FIGS. 5A to 5E.

Figure 5A:
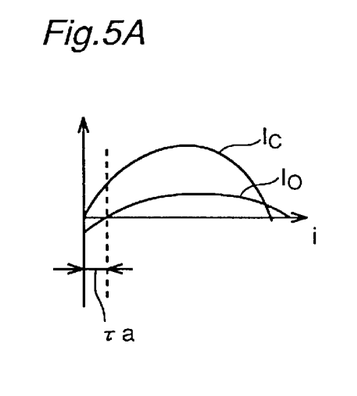
FIGS. 5A to 5E show signal waveforms which appear during the process of forming waveforms in the inverter control device in accordance with the first embodiment.
Figure 5B:
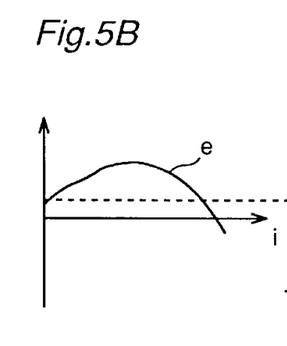
Figure 5C:
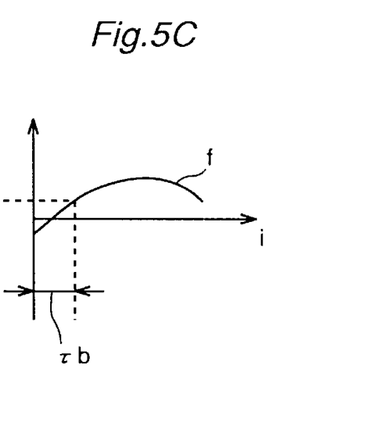

Referring to FIG. 5A, the output current signal $I_0$ input to high frequency PWM inverter control portion 22 is delayed by τa from reference current signal $I_C$ because of the signal processing in inverter device 1. Therefore, the error signal e output from subtracting portion 26c has such a waveform as shown in FIG. 5B. The error amplifying portion 26b multiplies the error signal e by error amplification factor α (0<α≦1) to provide error amplified signal e1, which is output to the first low pass filter 27. The first low pass filter 27 removes the high frequency component of error amplified signal e1 and provides the result as output f shown in FIG. 5C to delay portion 28. At this time, the output f of the first low pass filter 27 is output delayed by τb, because of the filtering by the first low pass filter 27.

Figure 5D:
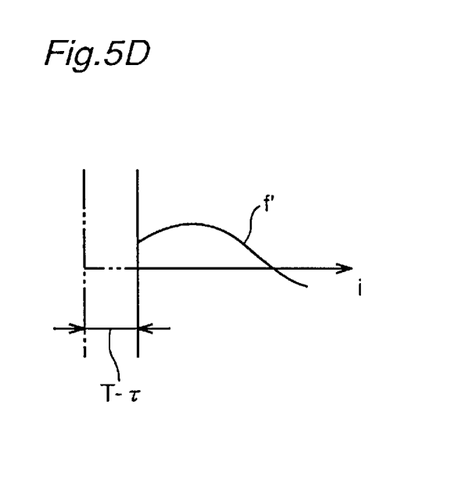

Delay portion 28 delays error amplified signal e1 by the time T−τ (T=fundamental period of inverter output current signal $I_0$, τ=τa+τb) as shown in FIG. 5D, and outputs it to error waveform integrating portion 29.

Figure 5E:
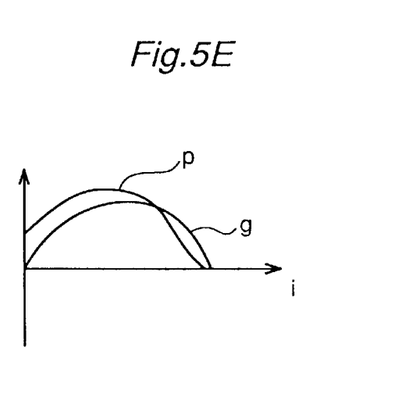

In error waveform integrating portion 29, adding portion 29a adds the output f' of delay portion 28 to the driving waveform pattern g of the last period stored in driving waveform memory 29b, and in this manner, inverter driving waveform pattern P is updated as shown in FIG. 5E.

As described above, in the periodic component control portion, influence of disturbance N and influence of delay generated in inverter device 1 can be eliminated. However, since relative phase advancing process is performed to eliminate the influence of delay, control response to abrupt change in load is delayed at least close to one period. Accordingly, undesirable phenomena including irregular current waveform and excessive current are experienced in this time lag.

Control operation when the unsteady component control portion is operated by itself will be described. Error signal e (=Ic−I$_0$) formed at subtracting portion 26c is input to proportional control portion 31. Proportional control portion 31 performs proportional compensation (amplification) of error signal e with proportional gain K and forms the second error amplified signal e2. Based on the second error amplified signal e2 formed in this manner, gate on time T$_{on}$ is formed in PWM operating portion 33. High frequency gate driving portion 23 switches high frequency inverter bridge 5 based on gate on time T$_{on}$.

Assuming that transfer characteristic of inverter hi control device 17 and the like is constant amplification and that the gain of inverter device 1 itself is 1, then the output current signal I$_0$ is given by the following equation (6).

$$I_0 = Ic \times K/(1+K) \tag{6}$$

However, because of the structure of inverter device 1, there is inevitable disturbance N superposed on output current signal I$_0$. One example of the disturbance N is generated in the following circumstance. More specifically, disturbance N is caused by non-linearity derived from the fact that the collector current at the time of turn on of a switching element such as an IGBT (Insulated Gate Bipolar Transistor) constituting the inverter main circuit is not proportional to the actual on time. If such disturbance N is generated, harmonics distortion of fundamental frequency is superposed on the output current.

Since this disturbance N is superposed on the output current signal I$_0$, the actual output current signal I$_0$ is as represented by the following equation (7).

$$I_0 = Ic \times K/(1+K) + N \times 1/(1+K) \tag{7}$$

In this manner, the unsteady component control portion performs unsteady component control basically by the control operation similar to that performed by the proportional control portion 31, and therefore influence of disturbance N cannot be eliminated. Further, influence of delay experienced in the inverter device 1 cannot be eliminated, either. However, relative phase advancing process is not effected on inverter driving waveform pattern P. Therefore, even when load 3 changes abruptly, quick response control to the abrupt change is possible. Therefore, undesirable phenomena such as irregular current waveform and excessive current caused by the abrupt change in load 3 can be prevented.

Inverter device 1 includes both the periodic component control portion and the unsteady component control portion, and control operations by these control portions are performed in parallel. Accordingly, both control portions make up for the disadvantageous of each other, enabling removal of the influence of the above described disturbance N derived from non-linearity, removal of influence of the delay and also enabling quick control response against abrupt change in load.

Figure 6A:
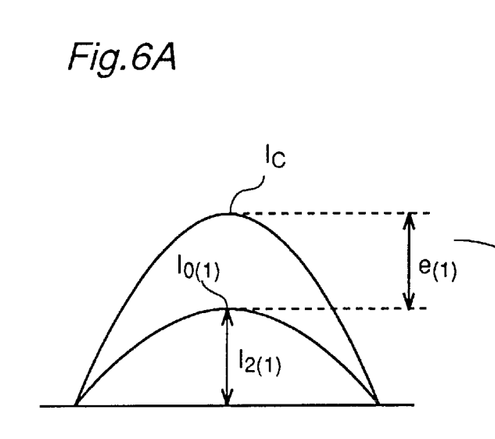
FIGS. 6A to 6C show waveforms of inverter output current signals at various timings of the inverter device in accordance with the first embodiment.
Figure 6B:
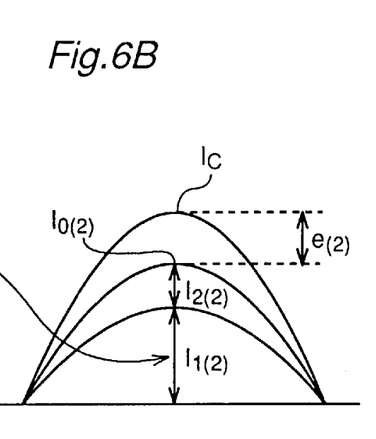
Figure 6C:
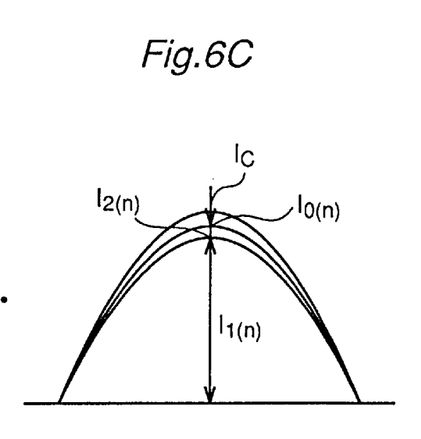

Control operation of inverter control device 17 as a whole in which the periodic component control portion and the unsteady component control portion operate in parallel will be described with reference to FIGS. 6A to 6C. In FIGS. 6A to 6C, for convenience of illustration, only the signals such as inverter output current signal I$_0$ corresponding to half period of the AC waveform are shown.

In the periodic component control portion, relative phase advancing process is effected on the inverter driving waveform pattern P, and therefore the effect of feedback appears delayed by one period. Therefore, in the first period after the start of control operation, only the influence of control by the unsteady component control portion appears on the inverter output current signal I$_0$. For simplicity of description, here, it is assumed that the proportional gain K of unsteady component control portion (proportional control portion 31) is 1, and convergence coefficient μ (=error amplification factor α of error amplifying portion 26d) of periodic component control portion is 1.

In the first period, only the unsteady component control portion functions, and the inverter output current signal I$_{0(1)}$ at that time is given by the following equation (8).

$$I_{0(1)} = I_{2(1)} = I_C/2 \tag{8}$$

I$_{2(1\sim n)}$: inverter output current signal controlled by the unsteady component control portion I$_C$: reference current signal The inverter output current signal I$_{0(1)}$ in a graphical representation is as shown in FIG. 6A. Further, current error (error signal) e$_{(1)}$ (=I$_C$−I$_{0(1)}$) at this time is fed back by the periodic component control portion, and appears in the next period, as the output current signal I$_{1(2)}$ resulting from periodic control. At this time, output current signal I$_{2(2)}$ also appears as the result of unsteady component control by the unsteady component control portion. The output current signal I$_{2(2)}$ is represented by the following equation (9).

$$I_{2(2)} = (I_C - I_{1(2)})/2 \tag{9}$$

I$_{1(2\sim n)}$: inverter output current signal controlled by the periodic component control portion Therefore, the inverter output current signal I$_{0(2)}$ of the second period is represented by the following equation (10).

$$I_{0(2)} = I_{1(2)} + I_{2(2)} = I_C/2 + I_C/4 \tag{10}$$

The inverter output current signal I$_{0(2)}$ is shown in FIG. 6B.

Further, the current error (error signal) e$_{(2)}$ (=I$_C$−I$_{0(2)}$) at this time is fed back by the periodic component control portion, and appears as the output current signal I$_{1(3)}$ resulting from the periodic component control in the next period. At this time, output current signal I$_{2(3)}$ also appears as a result of unsteady component control by the unsteady component control portion. Therefore, the inverter output current signal I$_{0(3)}$ in the third period is represented by the following equation (11).

$$I_{0(3)} = I_{1(3)} + I_{2(3)} = (I_C/2 + I_C/4) + I_C/8 \tag{11}$$

Therefore, the inverter output current signal I$_{0(n)}$ of the nth period is given by the following equation (12).

$$I_{0(n)} = I_{1(n)} + I_{2(n)}$$

$$I_{1(n)} = (1 - 2^{1-n}) \times I_C$$

$$I_2(n) = 2^{-n} \times I_C \tag{12}$$

In this manner, every inverter output current signal I$_0$ comes to have the current component I$_{1(2\sim n)}$ controlled by the periodic component control portion. However, the unsteady component derived from subtle fluctuation in load, for example, cannot be controlled by the periodic waveform control portion. Therefore, some of the current error (when K=1, ½ of the current error) generated from such component is addressed by the unsteady component control portion, whereby current distortion is suppressed as compared when control is performed only by the periodic component control portion.

Though it is assumed that the proportional gain K of the unsteady component control portion (proportional control portion 31) of inverter device 1 is constant, the proportional gain K of the unsteady component control portion (proportional control portion 31) may be changed in accordance with the sign of error signal e. For example, when the waveform of inverter output current signal $I_0$ is smaller than the reference current signal $I_C$ (when the sign of error signal e is +), then the proportional gain K is set low. When the waveform of inverter output current signal $I_0$ is larger than the reference current signal $I_C$ (when the sign of error signal e is −), then the proportional gain K is set high. In this manner, it becomes possible to more quickly suppress the disadvantageous phenomenon that the output current of inverter device 1 comes to be excessive current because of abrupt change in load.

In inverter device 1, a structure similar to proportional control portion (error amplifying portion 57 of FIG. 1) is used for the unsteady component control portion. However, the proportional control portion is for controlling all the signal components no matter whether it is periodic component or unsteady component. Therefore, control of unsteady component only is not possible by the proportional control portion by itself.

However, when the proportional control portion and the periodic component control portion are both provided and operated in parallel, the periodic component of inverter output current signal $I_0$ is controlled with priority by the periodic component control portion, and therefore only the unsteady component of the signal is controlled by the proportional control portion. In other words, by operating the proportional control portion and the periodic component control portion parallel to each other, the periodic component control portion provides the function of separating the periodic component from the unsteady component of the inverter output current signal $I_0$ (signal separation function), and therefore the proportional control portion functions as the unsteady component control portion. Details will be described in the following.

When we represent the proportional gain of unsteady component control portion (proportional control portion) as K, the inverter output current signal $I_{o2}$ controlled by the unsteady component control portion (proportional control portion) has current waveform of K/(K+1) times the reference current signal $I_C$, that is, $I_{o2}=I_C \times K/(K+1)$. However, when the unsteady component control portion (proportional control portion) and the periodic component control portion are operated in parallel, the inverter output current signal $I_{o2}'$ controlled by the unsteady component control portion (proportional control portion) comes to have the current waveform K/(K+1) times the current waveform $I_C-I_{o1}$, that is, reference current signal $I_C$ minus the inverter output current signal $I_{o1}$ controlled by the periodic component control portion, that is, $I_{o2}'=(I_C-I_{o1}) \times K/(K+1)$. Thus it is understood that the periodic component control portion is given priority to the unsteady component control portion.

Figure 7A:
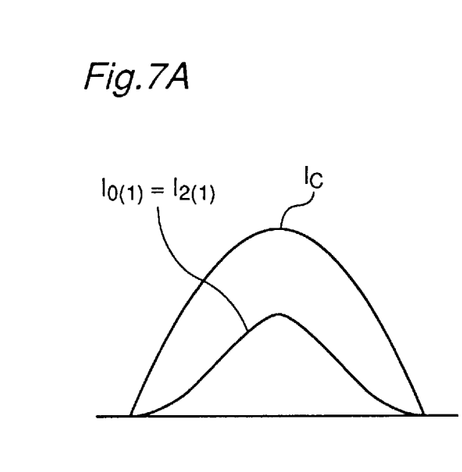
FIGS. 7A to 7C show waveforms of the inverter output current signal at various timings in the inverter device of the first embodiment.
Figure 7B:
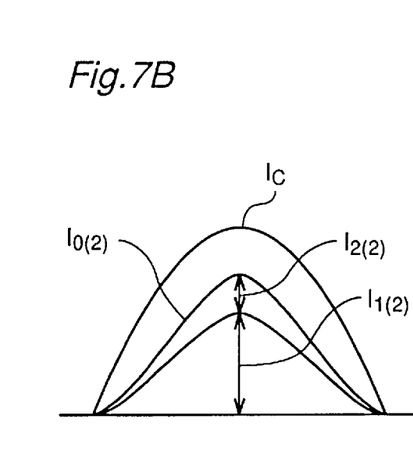
Figure 7C:
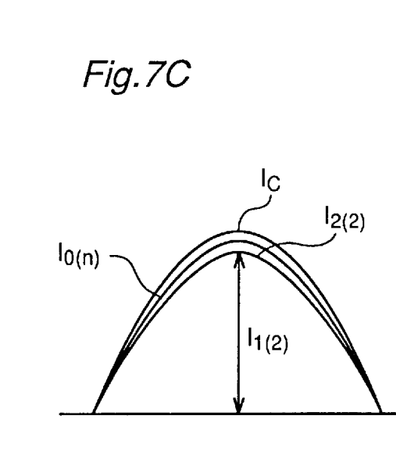

FIGS. 7A to 7C are illustrations of the operational waveforms when there is harmonics distortion of fundamental frequency derived from the fact that the collector current at the time of turn on of the IGBT is not proportional to the on time, in control operation by the unsteady component control portion (proportional control portion). Since the collector current at the time of turn on of the IGBT is not proportional to the on time, the inverter output current signal $I_{2(1)}$ resulting from the unsteady component control (proportional control) of the first period after the start of control operation is distorted, containing odd numbered harmonics, as shown in FIG. 7A. However, in inverter device 1, the unsteady component control (proportional control) and the periodic component control are performed in parallel, and therefore in the next period, current resulting from periodic component control is output to correct such harmonics distortion, and the distortion is corrected to some extent as shown in FIG. 7B. Accordingly, period after period, the periodic distortion component is gradually corrected by the periodic component control as shown in FIG. 7C. Eventually, every inverter output current signal $I_0$ including both the fundamental wave and harmonics component comes to be the current $I_1$ controlled by the periodic component control portion. Only the unsteady component derived from load fluctuation or the like is corrected by the unsteady component control portion (proportional control portion). Accordingly, it becomes possible to make current distortion smaller than when either one of the control portions (periodic component control portion and unsteady component control portion) performs control of the inverter output current signal $I_0$.

As described above, by parallel operation of the periodic component control portion and the unsteady component control portion, an effect which could never be obtained by either one of these control portions, that is, reduction of output waveform distortion (effect provided by the periodic component control portion) combined with rapid response (effect provided by the unsteady component control portion) is obtained.

A signal separator 38 (see FIG. 4) for separating the periodic component from the unsteady component may be inserted in a preceding stage of the input to proportional control portion 31, so that only the unsteady component is input through signal separator 38 to proportional control portion 31.

In inverter device 1, the delay generated in the current feedback loop of the unsteady component control portion is not compensated for. This is because the proportional gain K of the unsteady component control portion can be made so small as to prevent generation of high frequency oscillation, as the harmonics distortion experienced in the conventional proportional control portion is compensated for by the periodic component control portion of the inverter device 1.
(Second Embodiment)

The present invention may be applied to a high frequency PWM inverter control portion 40 including an adaptive FIR (Finite Impulse Response) digital filter. More specifically, what is required of the periodic component control portion of the present invention is, as already described, to generate a periodic waveform of which one unit is half period of the fundamental wave of inverter output current signal $I_0$ and to output this in synchronization with a zero cross of the mains voltage. Such periodic waveform is formed by successively integrating current error waveforms of half period of the fundamental wave. Accordingly, the present invention may be implemented in the high frequency PWM inverter control portion 40 employing the adaptive FIR digital filter shown in FIG. 8.

High frequency PWM inverter control portion 40 has basically the same structure as shown in FIG. 4. However, it is characterized in that in integrating the current error amplified waveform, the driving waveform pattern g is delayed so as to relatively advance the error waveform pattern (=error amplified signal e1) with respect to the driving waveform pattern g of the last period.

Figure 8:
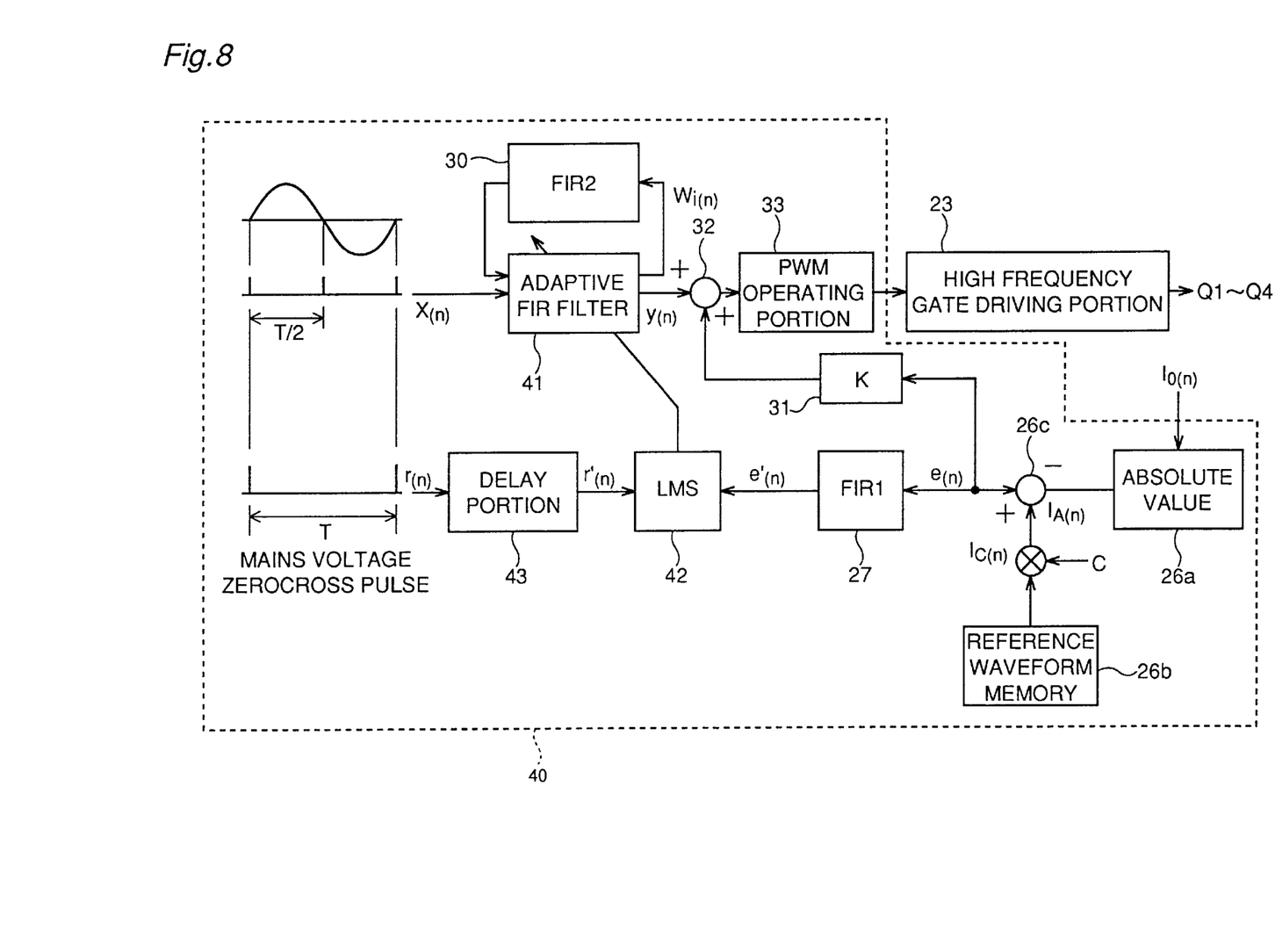
FIG. 8 is a block diagram showing a schematic structure of the inverter control device in accordance with the second embodiment.

The high frequency PWM inverter control portion 40 includes, in place of error amplifying portion 26d, delay portion 28, adder 29a and driving waveform memory 29b of high frequency PWM inverter control portion 22 of FIG. 4, an adaptive FIR filter 41, LMS (Least Mean Square) algorithm operating portion 42 and a delay portion 43.

Control operation of the high frequency PWM inverter control portion 40 is as follows.

Adaptive FIR filter 41 receives an input signal x(n) which is a zero cross detection pulse R of the voltage of the mains. The input signal x(n) is represented by the following equation (13).

$$x(n) = \sum_{m=0}^{\infty} \delta(n - mN) \qquad (13)$$

$N=T/(2\Delta t)$

T: period of the voltage of the mains $\Delta t$: sampling period n: sampling time (discrete time)

The adaptive FIR filter 41 receiving the input signal x(n) provides an output signal y(n) represented by the following equation (14).

$$y(n) = \sum_{i=0}^{I-1} w_i(n) \sum_{m=0}^{\infty} \delta(n - mN - i) \qquad (14)$$

I: tap number (I=N) of adaptive FIR filter 41

In equation (14), $\delta(n-mN-i)$ assumes the value 1 only when i=n–mN, and therefore the output y(n) can be represented by the following equation (15).

$$y(n) = w_{n \bmod N}(n) \qquad (15)$$

Accordingly, it is understood that filter coefficient $w_i$ is output successively as the output y(n) of adaptive FIR filter 41. PWM operation is performed in PWM operating portion 33 based on the output signal y(n) and, based on the result of operation, inverter device 1 is driven. In other words, in the high frequency PWM inverter control portion 40, filter coefficient $w_i$ of adaptive FIR filter portion 40, filter coefficient $w_i$ of adaptive FIR filter 41 is the data $w_i$ of the inverter driving waveform pattern P.

Meanwhile, the inverter output current signal $I_O$ at a point of connection to the mains formed in this manner is detected by inverter output current detector 14 (see FIG. 3). The detected inverter output current signal $I_O$ is converted to a digital signal $I_{O(n)}$ by A/D converter 16 (see FIG. 3), and thereafter input to high frequency PWM inverter control portion (DSP) 40. The inverter output current signal $I_{O(n)}$ input to high frequency PWM inverter control portion 40 is converted to absolute value $I_A(n)$ by absolute value operating portion 26a. Subtractor 26c compares the reference current signal $I_C$ output from reference waveform memory 26b with the absolute value $I_A(n)$, and provides an error signal $e(n)=I_C(n)-I_A(n)$.

The first low pass filter 27 removes analog high frequency noise such as switching noise included in error signal e(n) and provides a current error signal e'(n).

Now, assume that transfer function C(z) of a path from the output of adaptive FIR filter 41 to the output of the first low pass filter 27 is the delay $(z^{-d})$ of discrete time d, that is, $(C(z)=z^{-d})$. When $E(n)=\{e'(n)\}^2$ is minimized as evaluation function, the gradient of the evaluation function E(n) is represented by the following equation (16).

$$\frac{\partial E(n)}{\partial w_i(n)} = -2e'(n) \frac{\partial y(n-d)}{\partial w_i(n)} = -2e'(n) \sum_{m=0}^{\infty} \delta(n - mN - i - d) \qquad (16)$$

Therefore, if the filter coefficient $w_{i(n)}$ is gradually updated in the direction reverse to the gradient of equation (16) described above, the evaluation function E(n), that is, power of the current error signal e'(n) gradually attains to the minimum value. It goes without saying that the condition for such control is that phase difference is at most $\pi/2$.

$$w_i(n+1) = w_i(n) + \mu e'(n) \sum_{m=0}^{\infty} \delta(n - mN - i - d) \qquad (17)$$

$$= w_i(n) + \mu e'(n) x(n - i - d)$$

$\mu$: conversion coefficient which assumes a small positive value. This coefficient corresponds to error amplification factor ax of error amplifying portion 26d.

The finally obtained updating algorithm of the inverter driving waveform data is as represented by (17), which updating equation (17) represents integration with error signal e(n) multiplied by $\mu$.

In the actual high frequency PWM inverter control portion 40, not the above equation (17) but the following equation (18) is employed, from the following reason. More specifically, adaptive operation of filter coefficient $w_i$ is performed in half the period of mains voltage and adaptive operation is not performed in the remaining half period, so as to ensure time for operation of the second low pass filter 30.

$$W_i(n+1) = w_i(n) + \mu e'(n) \sum_{m=0}^{\infty} \delta(n - 2mN - i - d) \qquad (18)$$

$$= w_i(n) + \mu e'(n) r(n - i - d)$$

In equation (18), r(n) represents pulses obtained by thinning out every other X(n) which represents zero cross detection pulses, and delay of discrete time d is added by delay portion 43 to r(n). This delaying process d exhibits the function of relatively advancing the error waveform pattern in phase (actually, delaying the inverter driving waveform pattern) in updating the inverter driving waveform data.

In high frequency PWM inverter control portion 40, updating operation of the inverter driving waveform data in accordance with equation (18) is performed by LMS algorithm operating portion 42. In high frequency PWM inverter control portion 40, the second low pass filter 30 is used for removing high frequency component of filter coefficient sequence $w_i$ of adaptive FIR filter 41, which operation is similar to the operation of the second low pass filter 30 of high frequency PWM inverter control portion 22 (see equation (5)). Therefore, description thereof is not repeated. Further, processing in proportional control portion 31 of high frequency PWM inverter control portion 40 is also similar to that of proportional control portion 31 in high frequency PWM inverter control portion 22, and therefore, description thereof is not repeated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An inverter control device, comprising:

error detecting means for detecting an error between a desired output waveform and an inverter output waveform;

periodic component control means for controlling said inverter output waveform such that periodic component of the error detected by said error detecting means is reduced; and unsteady component control means for controlling said inverter output waveform such that unsteady component of the error detected by said error detecting means is reduced.

2. The inverter control device according to claim 1, wherein said periodic component control means includes driving waveform pattern generating means for integrating waveform pattern of the error detected by said error detecting means for generating an inverter driving waveform pattern, and output control means for adjusting said inverter output waveform to said desired output waveform, based on the inverter driving waveform pattern generated by said driving waveform pattern generating means.

3. The inverter control device according to claim 2, wherein said unsteady component control means includes proportional control means for generating an error amplified signal based on said error, and adding means for adding the error amplified signal generated by said proportional control means to said inverter driving waveform pattern; and said output control means adjusts said inverter output waveform based on a result of addition by said adding means.

4. The inverter control device according to claim 2, wherein said driving waveform pattern generating means adjusts phase of said error such that delayed phase generated in an output feedback loop is relatively advanced in phase.

5. The inverter control device according to claim 4, wherein said driving waveform pattern generating means integrates said error waveform pattern by providing a delay of a prescribed time period, when said inverter driving waveform pattern of a prescribed period is to be generated.

6. The inverter control device according to claim 5, wherein said driving waveform pattern generating means integrates said error waveform pattern delayed by (T–τ) where T represents prescribed period of said inverter output waveform and τ represents delay time of the output feedback loop.

7. The inverter control device according to claim 2, further comprising high frequency removing means for removing high frequency component of said inverter driving waveform pattern.

8. The inverter control device according to claim 3, wherein said proportional control means changes gain of error amplification in accordance with a sign of said error.

9. The inverter control device according to claim 1, wherein said periodic component control means includes an adaptive FIR filter receiving as an input a zero cross pulse of a voltage of mains, filter coefficient updating means for successively updating filter coefficient of said adaptive FIR filter in accordance with LMS algorithm so as to minimize waveform of said error, and output control means for adjusting said inverter output waveform based on an output from said adaptive FIR filter.

10. The inverter control device according to claim 9, wherein said unsteady component control means includes proportional control means for generating an error amplified signal based on said error, and adding means for adding the error amplified signal generated by said proportional control means to said inverter driving waveform pattern; and said output control means adjusts said inverter output waveform based on a result of addition by said adding means.

11. The inverter control device according to claim 9, wherein said filter coefficient updating means adjusts phase of said inverter driving waveform pattern such that delayed phase generated in an output feedback loop is relatively advanced in phase.

12. The inverter control device according to claim 11, wherein said filter coefficient updating means updates the filter coefficient of said adaptive FIR filter based on a zero cross pulse of a voltage of mains delayed by a prescribed time period.

13. The inverter control device according to claim 12, wherein said prescribed time period is a delay time of the output feedback loop.

14. The inverter control device according to claim 9, further comprising high frequency removing means for removing high frequency component of said inverter driving waveform pattern.

15. The inverter control device according to claim 10, wherein said proportional control means changes gain of error amplification in accordance with a sign of said error.

16. The inverter control device according to claim 1, wherein said unsteady component control means controls such that prescribed ratio of said error is reduced, and said periodic component control means controls such that periodic component of remaining error attains to zero.

17. The inverter control device according to claim 1, wherein said periodic component control means and said unsteady component control means are respectively configured so they are operated in parallel.

18. A method of controlling an inverter, for adjusting an inverter output waveform to a desired output waveform, comprising the steps of:

detecting error between said desired output waveform and said inverter output waveform;

controlling said inverter output waveform such that periodic component of said detected error is reduced; and controlling said inverter output waveform such that unsteady component of said detected error is reduced.

19. The method of controlling an inverter according to claim 18, wherein said step of controlling said inverter output waveform such that periodic component of said detected error is reduced includes the steps of integrating waveform pattern of said detected error and generating an inverter driving waveform pattern, and adjusting said inverter output waveform to said desired output waveform based on said generated inverter driving waveform pattern.

20. The method of controlling an inverter according to claim 19, wherein said step of controlling said inverter output waveform such that unsteady component of said detected error is reduced includes the steps of generating an error amplified signal based on said error, and adding said generated error amplified signal to said inverter driving waveform pattern; and said step of adjusting said inverter output waveform to said desired output waveform includes the step of adjusting said inverter output waveform based on said result of addition.

21. The method of controlling an inverter according to claim 19, wherein in said step of generating said inverter driving waveform pattern, phase of said error is adjusted such that delayed phase generated in an output feedback loop is relatively advanced in phase.

22. The method of controlling an inverter according to claim 21, wherein in said step of generating said inverter driving waveform pattern, said error waveform pattern is integrated delayed by a prescribed time period, in generating said inverter driving waveform pattern of a prescribed time period.

23. The method of controlling an inverter according to claim 22, wherein in said step of generating said inverter driving waveform pattern, said error waveform pattern is integrated delayed by (T−τ) where T represents prescribed period of said inverter output waveform and τ represents delay time of said output feedback loop.

24. The method of controlling an inverter according to claim 19, further comprising the step of removing high frequency component of said inverter driving waveform pattern.

25. The method of controlling an inverter according to claim 20, wherein in said step of generating an error amplified signal based on said error, gain of error amplification is changed in accordance with a sign of said error.

26. The method of controlling an inverter according to claim 18, wherein said step of controlling said inverter output waveform such that periodic component of said detected error is reduced includes the steps of outputting a filter coefficient of an adaptive FIR filter using a zero cross pulse of a voltage of mains as a reference, successively updating said filter coefficient of the adaptive FIR filter in accordance with LMS algorithm such that said error waveform is minimized, and adjusting said inverter output waveform based on said output filter coefficient of the adaptive FIR filter.

27. The method of controlling an inverter according to claim 26, wherein said step of controlling said inverter output waveform such that unsteady component of said detected error is reduced includes the steps of generating an error amplified signal based on said error, and adding said generated error amplified signal to said output filter coefficient of the adaptive FIR filter, and in said step of adjusting said inverter output waveform based on said output filter coefficient of the adaptive FIR filter, said inverter output waveform is adjusted based on said result of addition.

28. The method of controlling an inverter according to claim 26, wherein in said step of updating said filter coefficient, phase of said inverter driving waveform pattern is adjusted such that delayed phase generated in an output feedback loop is relatively advanced in phase.

29. The method of controlling an inverter according to claim 28, wherein in said step of updating said filter coefficient, the filter coefficient of said adaptive FIR filter is updated based on the zero cross pulse of the voltage of the mains delayed by a prescribed time period.

30. The method of controlling an inverter according to claim 29, wherein said prescribed time period is a delay time of the output feedback loop.

31. The method of controlling an inverter according to claim 26, further comprising the step of removing high frequency component of said inverter driving waveform pattern.

32. The method of controlling an inverter according to claim 27, wherein in said step of generating said error amplified signal, gain of error amplification is changed in accordance with a sign of said error.

33. The method of controlling an inverter according to claim 18, wherein in said step of controlling said inverter output waveform such that periodic component of said detected error is reduced, the inverter output waveform is controlled such that prescribed ratio of said error is reduced, and in said step of controlling said inverter output waveform such that unsteady component of said detected error is reduced, the inverter output waveform is controlled such that periodic component of remaining error attains to zero.

34. The method of controlling an inverter according to claim 18, wherein said step of controlling said input waveform such that periodic component of said detector is reduced and said step of controlling said input waveform such that unsteady component of said detector is reduced are performed in parallel.

* * * * *